Sept. 11, 1923.
G. F. JOHNSTONE
CLAMPING CONTACT TERMINAL
Filed April 17, 1922
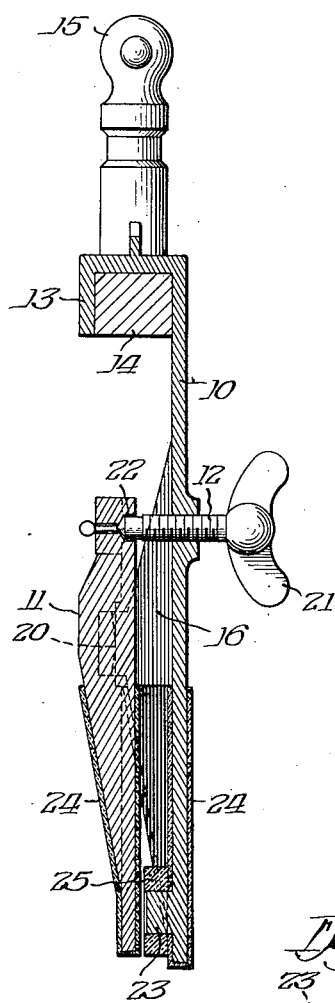
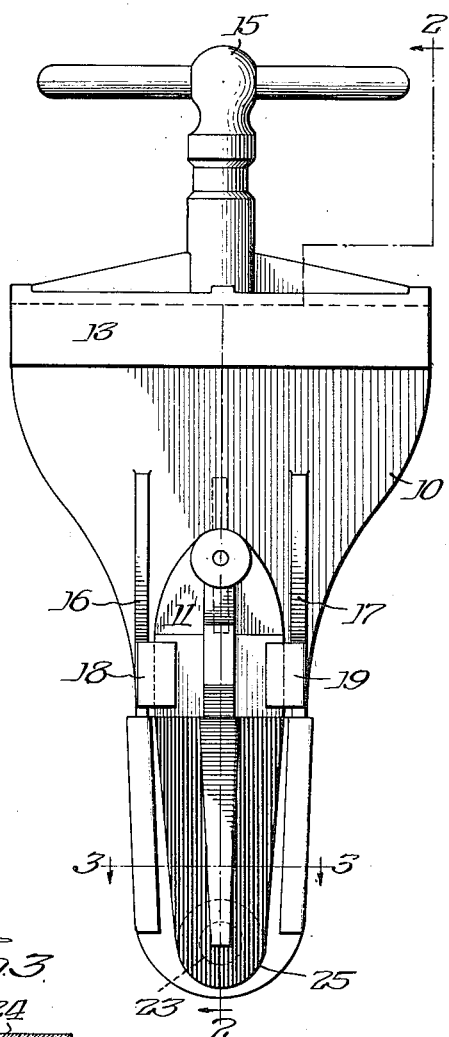
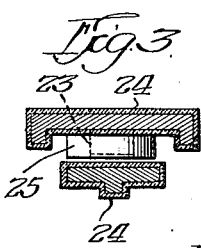

Patented Sept. 11, 1923.

1,467,432

UNITED STATES PATENT OFFICE.

GEORGE F. JOHNSTONE, OF CHICAGO, ILLINOIS.

CLAMPING CONTACT TERMINAL.

Application filed April 17, 1922. Serial No. 553,597.

*To all whom it may concern:*

Be it known that I, GEORGE F. JOHNSTONE, a citizen of the United States, residing at Chicago, in the county of Cook and State of Illinois, have invented a certain new and useful Improvement in Clamping Contact Terminals, of which the following is a full, clear, concise, and exact description, reference being had to the accompanying drawings, forming a part of this specification.

The invention relates to contact terminals or hangers which are constructed to releasably support an electrode or other element and which is applicable for use in connection with electrical etching machines or other allied devices in which the hanger supports the plate to be etched within an electrolyte which is employed to cause the decomposition of a metallic plate and thereby produce a printing plate or cut.

It is an object to provide a device of this character, the construction of which prevents its being decomposed or etched away while immersed in the electrolyte and while acting to support the plate during the etching process.

It is an additional object to provide a clamp which may act as a terminal to complete the circuit from the plate to the electrode from which the hanger is usually suspended within the electrolyte.

It is a further object to provide the clamping device with a contact making element which may engage the plate to be etched and to be protected against the etching action of the electrolyte during the etching process and while being submerged in the electrolyte.

It is a prime object of the invention to protect all portions of the clamp or hanger which are exposed to the action of the electrolyte during the etching action against this action which will thus add to the life of the device and eliminate the necessity of frequently replacing this portion of the structure.

In the particular embodiment of the invention illustrated in the drawings, two clamping elements are employed, the ends of which engage the plate to be etched and support it in the electrolyte. In the present construction these ends of the clamp are coated or encased within any suitable insulating material such as hard rubber or other similar insulating substance which will protect this portion of the clamp against the action of the electrolyte, thus preventing their being etched away during the period that that plate which they support is being etched.

One of these clamping elements is provided with a contact making element which contacts with the plate to be etched when the latter is inserted or arranged between the clamping portions of the structure and suspended in the electrolyte. This contact making element is surrounded in any suitable manner so that it is also protected against the action of the electrolyte during the etching process, yet is permitted to contact with the plate and complete the circuit.

Any desired construction may be resorted to, to accomplish this last named result, that herein shown and described consists of a soft rubber collar, which is passed over the contact making element and extends a slight distance beyond the end thereof. When the plate to be etched is arranged between this resilient insulating collar the clamping elements of the device, and pressure is applied to said clamping element the plate will be securely held between the clamping elements and contact will be made between the plate to be etched and the contact making element, this pressure is transmitted and applied to the resilient collar which produces a tight connection between the plate and the resilient collar which prevents the electrolyte from finding its way to the contact element which thus protects this portion against the action of the electrolyte yet permits the circuit to be completed and the etching process to take place without affecting any portion of the clamping element.

One end of the clamping device is constructed so that it may be readily associated with a supporting bar which is part of the circuit employed in the etching machine. The clamping element is provided with a handle whereby the clamp and the plate to be etched may be readily inserted and removed from within the electrolyte.

The invention will be explained and more readily understood when read in conjunction with the accompanying drawings which illustrate one construction which may be resorted to, it being obvious that changes and modifications may be resorted to without departing from the spirit of the appended claims forming a part hereof.

In the drawings Figure 1 is a front elevation of a device constructed according to one embodiment of the invention.

Figure 2 is a section taken on line 2—2 of Figure 1.

Figure 3 is a section taken on line 3—3 of Figure 1.

The structure illustrated in the drawings contemplates the use of two clamping elements 10 and 11 which are pivotally secured together and constructed to be actuated to releasably clamp an element such as a plate between them by means of the screw 12. The clamping element 10 is provided with the hook shaped end 13 which is constructed to engage the bar 14 whereby the entire structure is supported within the electrolyte of the etching machine herein before referred to. This portion 10 is further provided with the handle 15 whereby the device may be grasped and removed from or positioned with respect to the bar 14 to permit the removal and insertion of a plate to be etched within the electrolyte of the etching machine.

The member 10 is provided with the parallel ribs 16 and 17 having the inwardly projecting lugs 18 and 19, the underface of which are curved as indicated at 20. These inward projections cooperate with the removable portion 11 of the clamping element and provide a pivot therefor. The plate 10 also carries the wing or thumb nut 21 which is in threaded engagement with the body portion of the clamping element 10, and enters an apertured recess 22 provided adjacent the uppermost extremity of the element 11 of the clamping device, thus as the thumb nut 21 is actuated the swinging element 11 will pivot upon the lugs 18 and 19. Thus permitting a plate to be etched to be releasably held between the lowermost extremities of the portions 10 and 11. The element 10 is provided with the projection 23 which is an integral portion of the part 10 and is employed to contact with the plate to be etched when the latter is arranged between the ends of the clamping element in a manner to be held thereby.

By referring to Figure 1 it will be noted that the swinging element 11 is arranged between the parallel ribs or extensions 16 and 17 and by virtue of the inwardly projecting portions 18 and 19 and the connection between the thumb screw 21 and the element 11, this portion is held against accidental separation from the part 10. When a device such as that disclosed in the drawings is associated with an etching machine, the lowermost ends thereof between which the plate to be etched is clamped is immersed, in the electrolyte and is exposed to the etching action thereof. This action causes the immersed portions of the clamping device to be disintegrated or etched away which soon weakens the structure and renders it useless.

As before stated it is a prime object of the invention to provide a construction whereby these portions are protected against this disintegration or etching action of the electrolyte, and it is also an object to provide a means whereby the proper electrical connection may be accomplished between the clamping elements and the plate and to protect this last mentioned portion of the structure against the action of the electrolyte yet permitting the proper connection between the plate and the clamp so that the circuit may be completed.

In the particular structure illustrated in the drawings the lowermost ends of the clamping elements are completely surrounded by a sheath or coating of insulating material 24 which protects these portions of the clamping device against the action of the electrolyte.

The projection or contact making element 23 which extends from the member 10 is also but only partially covered with an insulating material 25. This last mentioned insulator 25 is composed of material which is relatively soft and permits of its being compressed so that when the plate to be etched is arranged between the lowermost part of the member 11 and the extension or contact making element 23 and pressure is applied to that point, the contact making element 23 and the insulator 25 will be brought into engagement with the plate to be etched.

The close connection provided between the resilient or compressible insulation 25 and the plate to be etched prevents the electrolyte from finding its way to the contact making element 23 thus this particular portion of the structure is also protected against the etching action of the electrolyte. Thus this entire lower portion of the structure which is immersed in the electrolyte is protected against the action thereof which will materially add to the life of the structure and overcome the objections now encountered in devices of this character.

From the foregoing description, it is evident that the arrangement provides a convenient structure which can be readily associated and removed from the conducting or supporting bar from which the plate to be etched is supported within the electrolyte.

It is further evident that the plate to be etched may be securely held by the structure, and it is also manifest that, said portion of the structure which is in contact with the electrolyte is protected against the action thereof yet permits the proper electrical connection to be made to insure the proper functioning of the device when arranged for use, and associated with an etching machine.

Having thus described the invention what I claim and desire to cover by Letters Patent is:

1. In a device of the character described the combination of a pair of members constructed to releasably engage and support another member between them, the parts thereof adjacent the portions which engage the member to be supported being insulated, one of said portions being provided with a contact making element which engages said member to be supported and means for protecting said contact when said contact is in engagement with said member.

2. In a device of the character described the combination of a pair of members constructed to releasably engage and support another member between them, the parts thereof adjacent the portions which engage the member to be supported being insulated, one of said portions being provided with a contact making element which engages said member to be supported and resilient means for protecting said contact when said contact is in engagement with said member.

3. In a device of the character described the combination of a pair of members constructed to releasably engage and support another member between them, the parts thereof adjacent the portions which engage the member to be supported being insulated, one of said portions being provided with a contact making element which engages said member to be supported and resilient insulating means for protecting said contact when said contact is in engagement with said member.

4. In a device of the character described the combination of a pair of members constructed to releasably engage and support another member between them, the parts thereof adjacent the portions which engage the member to be supported being insulated, one of said portions being provided with a contact making element which engages said member to be supported and means for surrounding said contact making element for protecting said contact when said contact is in engagement with said member.

5. In a device of the character described the combination of a pair of members constructed to releasably engage and support another member between them, the parts thereof adjacent the portions which engage the member to be supported being insulated, one of said portions being provided with a contact making element which engages said member to be supported and resilient means surrounding said contact making element for protecting said contact when said contact is in engagement with said member.

6. In a device of the character described the combination of a pair of members constructed to releasably engage and support another member between them, the parts thereof adjacent the portions which engage the member to be supported being insulated, one of said portions being provided with a contact making element which engages said member to be supported and resilient insulating means surrounding said contact making element, for protecting said contact when said contact is in engagement with said member.

7. In a device of the character described the combination of a pair of members constructed to releasably engage and support another member between them, the parts thereof adjacent the portions which engage the member to be supported being insulated, one of said portions being provided with a projection providing a contact making element which engages said member to be supported and an annular member surrounding said means for protecting said contact, when said contact is in engagement with said member.

In witness whereof, I hereunto subscribe my name this 23rd day of March, A. D. 1922.

GEORGE F. JOHNSTONE.